Nov. 17, 1964  R. K. A. WIIG  3,157,211
INTERNAL COMBUSTION ENGINE-DRIVEN HAND SAW
Filed June 20, 1960  2 Sheets-Sheet 1
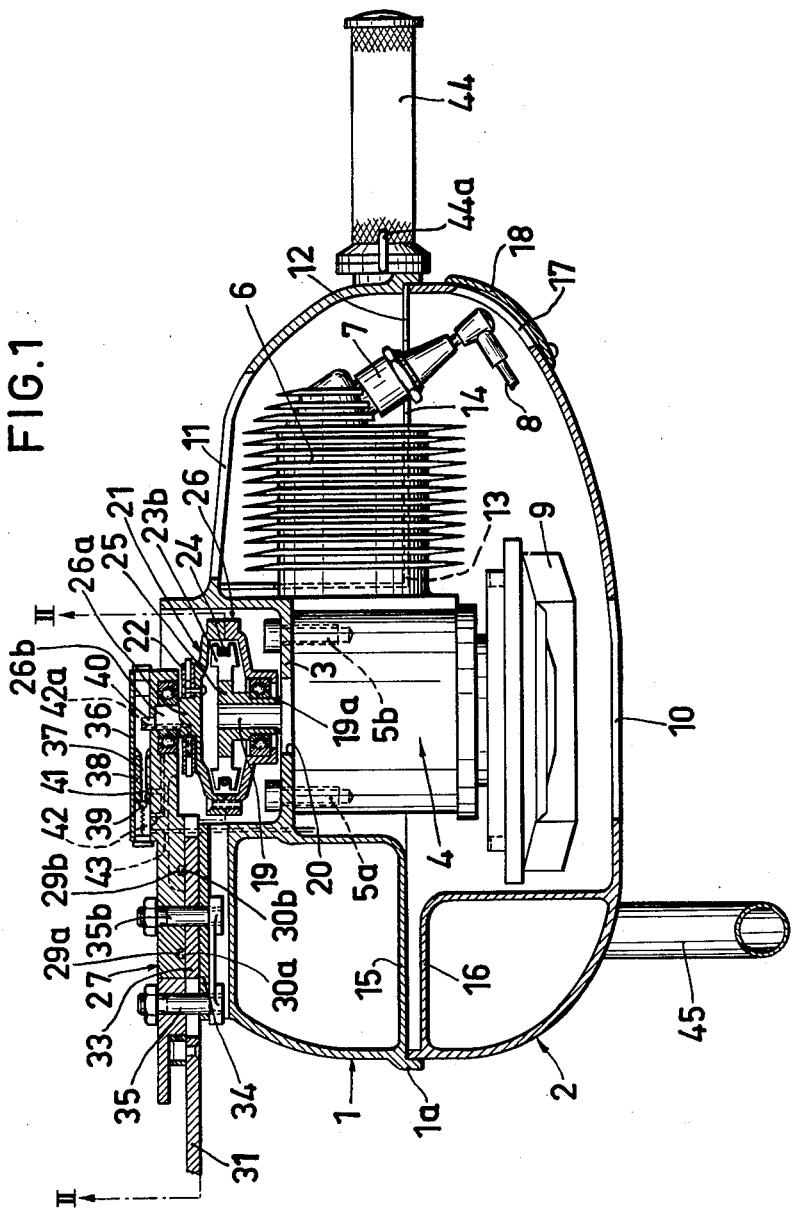

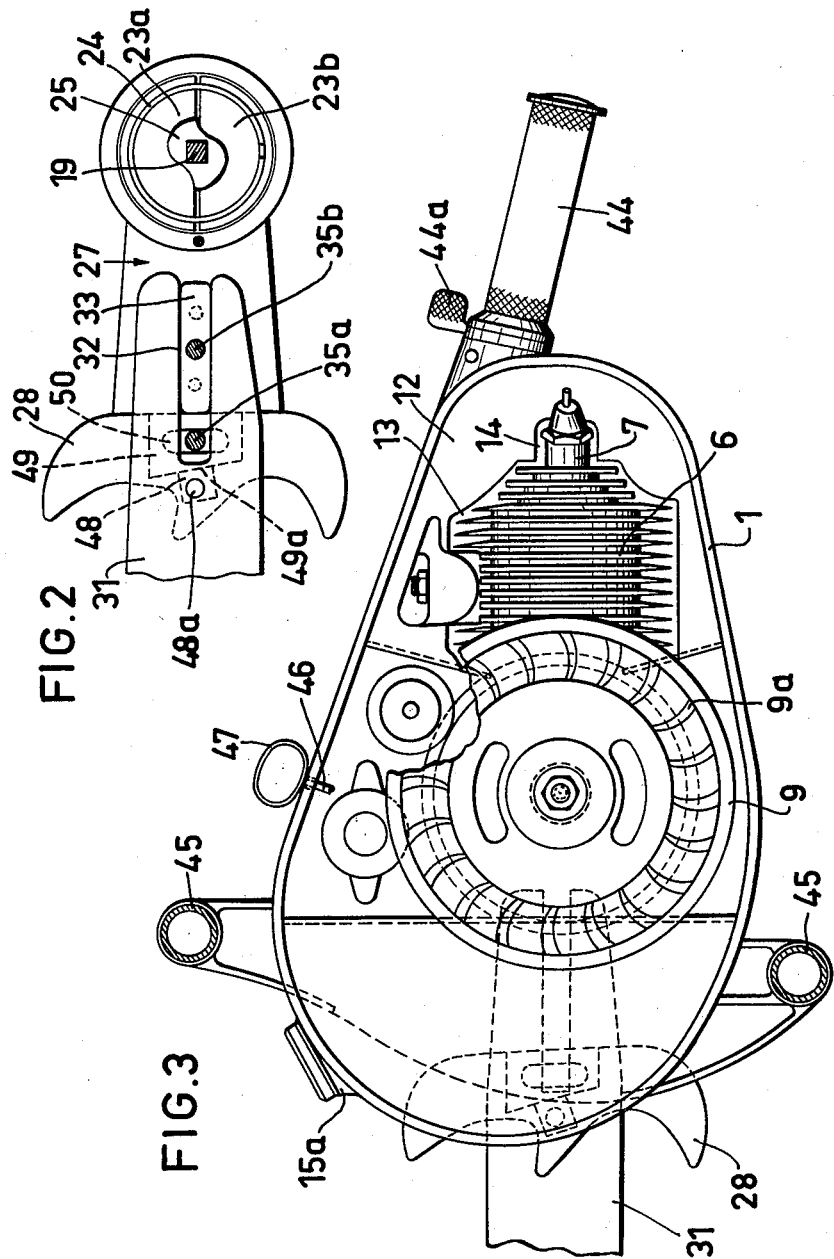

United States Patent Office 3,157,211
Patented Nov. 17, 1964

3,157,211
INTERNAL COMBUSTION ENGINE-DRIVEN
HAND SAW
Rasmus Kristian Austraat Wiig, Svarstad, Norway
Filed June 20, 1960, Ser. No. 37,449
Claims priority, application Sweden June 26, 1959
10 Claims. (Cl. 143—32)

This invention relates to an internal combustion engine-driven hand saw. In recent years the development of internal-combustion engine operated hand saws for woodworking was directed to an increasing degree towards a more attractive look while the real problem, combining high effect with sufficiently low total weight was neglected as more or less unsolvable.

For the average workman, a total saw weight of 10 kilograms appears to be the critical upper limit. A person of average physical strength is considered to be able to operate a saw of this weight for woodworking and to carry the saw from one working place to the other, but the work will be extremely tiring. Heretofore one did not succeed in constructing a saw having a weight approximate to said upper limit, and still less to reach below said limit, in spite of the fact that as constructional material light metal, for example magnesium alloys, was used. The weight of the lightest saw constructions at present on the market, inclusive full fuel tank, exceeds said critical upper weight limit by several kilograms which, as a matter of fact, makes the work with the saw extraordinarily taxing. All engine-driven hand saws of conventional type have in common that the engine serves as a frame for supporting all supplementary parts, such as fuel tank, controls, cooling fan, etc., as well as the chain-equipped guide bar and the handle. In view of the fact that in many cases the saw is subjected to a rough treatment partially owing to the carelessness of a less engine-minded owner and partially to the vegetation conditions on the working place, all parts of the saw must be of sturdy construction which, of course, contributes to the high weight of the saw.

Conclusively, the previously known engine-driven hand saws can be said to suffer from the two disadvantages of being too heavy and too clumsy to work with, owing to their bulky design with a lot of projecting parts and controls.

The aforesaid aggravating drawbacks are eliminated entirely by the invention, rendering it possible to manufacture an extremely compact and easily handled saw construction with a total weight of about 8 kilograms or less which has the same engine power as the conventional modern saw constructions. Owing to the fact that each decrease in weight below the aforesaid critical upper limit of about 10 kilograms is extremely important, the gain in weight obtained by the invention results in a high and uniform cutting output without exhausting the physical strength of the workman.

The aforesaid result is attained by means of a drastic change of the conventional construction of engine-driven hand saws.

The engine-driven hand saw according to the invention is substantially characterized in that it comprises an easily divisible, rigid, preferably moulded bearing shell or casing provided with inward supporting surfaces dimensioned for mounting the engine unit inclusive accessories and cooling fan thereon and with outward supporting surfaces for the fastening means and transmission of the chain-equipped guide bar, and further provided with holes for the respective control handles and with air inlet and air outlet.

A preferred embodiment of the engine-driven saw according to the invention with a two-piece casing is described in detail below, reference being had to the accompanying drawings of which FIG. 1 shows a schematic longitudinal vertical section through the engine-driven saw, FIG. 2 is a horizontal section of a saw detail along the line II—II in FIG. 1, and FIG. 3 is a schematic horizontal view of the saw with one half of the casing removed.

FIG. 1 shows the casing of the saw divided into two sections, the one section 1 having a peripheral guide flange 1a for maintaining the second section 2 in right position. Both sections are secured to each other in a simple (not shown) manner, preferably by means of ordinary screws. Both sections are manufactured of rigid material, for example of a light metal alloy, preferably by moulding. A recess in the upper surface of the section 1 has a wall 3 that forms on the inside of the casing an elevated fastening plane for a schematically shown internal combustion engine 4 of a type usually applied to engine operated saws. In the embodiment shown, the engine 4 is screwed on said wall 3 by means of four easily unscrewed screws of which only two, 5a and 5b, are shown in the figure. The engine comprises a cylinder 6 with a spark plug 7 and an easily detachable connecting cable 8 which in usual manner (not shown) is connected to the ignition device secured to the one end of the engine shaft. Said ignition device is provided with an oscillating magnet serving also as starting disc for cord starts and supports blades 9a forming a suction fan (see also FIG. 3). The air intake of said fan is formed by a net or grate covered hole 10 in the casing section 2, and the air outlet 11 is a hole in the first casing section 1, preferably in the form of a plurality of parallel slots. The engine cylinder 6 is located close to said outlet 11. An angular wall 12 separates the right portion of the casing section 1 according to FIGURE 1 from the remaining portion of said casing and has an opening 13 extending across the corner of the angle to receive the cylinder 6 in such a manner that the cylinder 6 projects with a portion of its surface through the horizontal portion of said opening according to FIGURE 1. Said horizontal portion of the opening 13 has an extension 14 (see FIG. 3) for the spark plug 7. The engine and, consequently, the combined oscillating magnet and suction fan being in operation, a strong overpressure is effected in the casing while atmospheric pressure prevails at the air outlet 11. As a result thereof, a pressure equalizing air stream passes rapidly in continuous manner through the opening 13 in the partition wall 12 towards the outlet 11 and sweeps the cooling fins of the cylinder 6 located between said opening 13 and said outlet 11. This appears to be the only way, i.e. by applying pressure above atmospheric pressure, to attain a sufficiently effective cooling. In another embodiment of the construction, the width of the opening 13 which according to FIG. 3 extends across the whole diameter of the cylinder can be made considerably smaller so that a slot is formed having, for example, a width equal to the elongation 14 of the opening 13. In this embodiment the horizontal portion of the angular wall 12 according to FIG. 1 must be easily disconnectible so that after the loosening of the four fastening screws the engine can be lifted out freely. According to another embodiment, the cylinder is surrounded by a cover having a first orifice opening freely into the casing and, spaced from said first orifice a second orifice communicating with the atmosphere via a tube-shaped duct extending through the casing wall and hermetically sealed thereto. By means of placing the exhaust pipe of the engine in said duct, the ejector effect thus obtained contributes in an effective manner to an increase in the pressure difference and, consequently, to an increase of the air stream.

In FIG. 1 two further angular walls are shown in a schematic manner, viz. the wall 15 in the casing section 1 and the wall 16 in the casing section 2. The chambers thus separated are intended as containers for fuel and liquid lubricant respectively. For reasons of better clarity, no filling hole (with the exception of the fuel nipple 15a in FIG. 3), no outlet and neither the pipes communicating with the latter are shown in the drawing. It may be emphasized, however, that the pipe connections should be devised to be disconnectible in the easiest possible manner, for example by means of plastic hoses and sleeves, so that after the unscrewing of the fastening screws the engine with the attached ignition device and fan can be readily removed.

For this purpose, a lever (not shown) operated from the gas regulator is provided in the casing close to the place where the carburetor of the mounted engine will be located, for actuating the control means of the carburetor. An aperture 17 in the casing section 2 covered by a removable plate 18 renders it possible to exchange the spark plug 7 in an easy manner without disassembling the casing.

The shaft 19 of the engine 4 extends outwards through an opening 20 in the aforementioned wall 3 of the casing section 1, said shaft supporting a known coupling means, designated in its entirety by 21, for transmitting the engine power to the drive means of the saw, i.e. to a toothed wheel 22 assembled with said coupling means. The shaft-operated coupling member comprises in known manner two semicircular brake discs 23a and 23b which by means of an enclosing open spring washer 24 (see also FIG. 2) are pressed against a cam means 25 rotating with the shaft. The shaft being in rotation, said discs 23a and 23b are owing to the centrifugal force slung with their periphery against the inside of the surrounding annular flange of the coupling member 26 which is rigidly secured to the toothed wheel 22. The braking effect thus obtained is thereafter increased by the keying action effected by the cam means 25 on the brake discs owing to a limited sliding motion along the correspondingly shaped sliding surfaces of the central portions of the discs, so that a strong coupling is attained.

Contrary to previously known constructions, however, the coupling means 21 is not keyed to the shaft 19, but forms a completely separate, loose unit. For this purpose, the shaft 19 of the embodiment shown is given a square cross-section, the hub of the driving coupling member, i.e. the cam means 25, having a corresponding cross-section with plain sliding fit. It is obvious that the same resistance to rotary motion also is obtainable with any cross-section of the shaft and the hub bore other than circular or by means of a groove and tongue joint. The axial mobility of the coupling is limited on the one side in that the hub (cam means) 25 abuts against a shoulder 19a on the shaft 19, and on the other side in that the hub 26a of the coupling member 26 in combination with the toothed wheel abuts against the easily dismountable fastening means for the chain-equipped guide bar which is described below in detail.

According to FIG. 2, the fastening means for the chain equipped guide bar comprises a plate 27 with an attached supporting claw 28, said plate on the side facing the casing after the mounting of the guide bar being provided with cylindrical recesses 29a and 29b (FIG. 1) to receive corresponding guide pilots 30a and 30b secured to a guide rib 33 cooperating with the end slot 32 of the guide bar 31, the guide rib 33 being fastened on the outer wall 34 of a double walled portion of the upper casing section 1. Two bolts 35a and 35b anchored in said outer wall 34 have corresponding holes in the guide bar fastening means 27 and claw 28 respectively, rendering it possible to thread said fastening means and said claw easily on said bolts and to fix them by means of nuts in such a manner that the rear end portion of the guide bar fastening means forms a stop and an end support for the coupling 21. A grease gun secured to the outer surface of said rear end portion comprises a cylinder 36, a piston 37, cylinder liner 38 and a spring-actuated check valve having the form of a ball 39. The piston 37 is driven by means of an eccentric journal 40 on the bearing shaft 26b of the coupling member 26, said journal engaging in a transverse slot on the piston. The liquid lubricant enters the cylinder from the afore-mentioned lubricant chamber separated in the casing section 2 by means of the wall 16 via the inlet 41 (only indicated) and is pumped out into the two indicated outlet ducts 42 and 43 of which the duct 42 communicates with the cylinder space outside the liner 38 and can via an opening (not shown) in the piston body communicate with a groove 42a in the eccentric journal 40, said groove extending into the coupling hub 26a and therefrom at right angle outwards into the toothed wheel 22. In this manner, the eccentric drive of the piston 37 and the cutting teeth chain (not shown) of the guide bar are lubricated continuously. The engine parts are lubricated in a manner not shown via the other outlet duct 43 for the lubricant.

The control handle 44 of the saw and its carrying yoke 45 are rigidly connected to the outside of the casing section 1, said handle 44 supporting a thumb-operated knob 44a for operating the aforementioned lever for actuating the carburetor via a cable (not shown). The start cord 46 (FIG. 3) actuating the oscillating magnet wheel 9 runs through a hole in the casing section 1 and is fastened to a starting handle 47. In said casing wall may further be provided a hole for a button to actuate the carburetor air valve (not shown).

In the embodiment shown, the conventional complicated adjustment of the chain saw stretching by means of turnscrews is replaced by quick-action adjustment means comprising a shoulder 48 fastened on the guide bar 31 with which shoulder cooperates an inclined surface 49a of a bar 49 fastened on the claw 28 displaceable in transverse direction relative to the plate 27 in such a manner that by lateral displacement of said claw 28 the desired stretching of the chain can be obtained in a moment, owing to the keying effect whereafter the claw is fixed by means of the bolt 35a which also serves as a guide pin for the guide slot 50 extending through the claw and the bar 49.

Due to the fact that the shoulder 48 around its periphery is provided with different guiding surfaces which by turning the shoulder can be directed selectively towards the guide surface 49a of the bar 49, a plurality of different adjustment ranges can be obtained. In the embodiment shown, the shoulder 48 pivoted around a pin 48a has four lateral edges at different distances from the centre of rotation so that four different adjustment ranges are obtained. The sliding surfaces of the shoulder 48 and of the key bar 49 are splash lubricated from the chain.

As appears from the aforesaid, the saw is constructed in a very compact and shielded manner but all parts, nevertheless, are easily accessible for inspection and exchange. By loosening a simple screw or locking joint the casing section 2 can be lifted off. For lifting off the guide bar and its fastening means, it is only necessary to loosen the nuts for the bolts 35a and 35b whereafter the entire coupling 21 can be drawn off easily from the engine shaft 19. The engine with accessories can be lifted out after the four fastening screws are loosened. The chain can be unstressed and dismounted without difficulty after the locking screw for the key bar is loosened, and also the guide bar can be separated from its fastening device. All this—and in like manner the assembling of said parts—can be carried out in a few minutes.

The surprisingly low weight is due to the unprecedented utilization of the classical constructional principle that for a given amount of material increased strength and rigidity is obtained by providing hollow spaces in the construction.

It, finally, can be added that the construction according to the invention not only is cheap to manufacture and well adapted for mass production but also robust and of easy maintenance. It will, of course, be understood, that the principles of the invention also can be applied to engine driven tools other than saws where the same problem of combining great effect with low weight and compact design is to be solved.

The invention is not limited to the embodiment described but various modifications are possible by exchanging various details against equivalent components.

Instead of using the separate coupling means 21 for transmitting the engine power to the saw transmission, is should be particularly possible to utilize the fly wheel of the engine for said coupling. In such a case, the engine is turned around its longitudinal axis 180 degrees from the position shown and its fly wheel is on its periphery provided with radially movable brake shoes, maintained in position in a suitable manner, for example by means of a circumferential helical spring connecting said shoes with each other, and intended to cooperate in known manner owing to the centrifugal force with a brake drum corresponding to the coupling member 26 rigidly connected with the toothed wheel 22. Said embodiment has the advantage of being of simpler construction than the embodiment shown, and further that owing to its robust construction the necessity of easy exchangeable coupling is not of such a decisive importance. As a further essential advantage can be mentioned that, due to the combination of the fly wheel and the coupling, less space is required, so that the total dimensions of the saw can be reduced still more, or that the gain in space can be utilized for other purposes, for example for increasing the cooling capacity if such an increase should be considered desirable.

What I claim is:

1. An engine driven hand saw for wood-cutting of the type comprising a chain-equipped guide bar and an internal combustion engine for driving said chain, said hand saw comprising an elongated substantially closed, continuously curved rigid hollow shell divided longitudinally into two sections, one of which serves as a lid for the opening in the other section, means for detachably securing said sections together, said shell having internal support faces for mounting the internal combustion engine with its accessories including a cooling fan, said shell having also external support faces for mounting the guide bar, transmission and handle, said shell being provided with openings for the engine control means, an air inlet opening in the wall of one section of said shell and an air outlet opening in the wall of the other section of said shell for the passage of a stream of cooling air through said shell, a fan mounted in said shell for propelling a stream of cooling air through said air inlet and air outlet openings, an engine mounted in said shell with its cylinder positioned in the path of said air stream and partition walls in said shell defining a fuel tank and a lubricant tank, the passage between the engine cylinder and the surrounding casing parts offering such a great resistance to the air propelled by the fan that a pressure considerably exceeding the atmospheric pressure is built up within the casing.

2. Saw according to claim 1, characterized in that the one of the casing sections carries on its inside the engine with accessories, the cooling fan and the fuel tank and supports on its outside in a recess corresponding to an elevation on the inside for the mounting of the engine a coupling means between the engine shaft extending outwardly through an opening in the casing wall and the chain drive said recess further supporting the fastening means for said guide bar as well as the control and carrying handle of the saw, the second of the casing sections substantially having the character of a cover.

3. Saw according to claim 1, characterized in that the engine is provided with a guide surface to cooperate with a correspondingly shaped supporting surface in the casing and is disposed freely accessible after the removal of the opposite casing section so that the engine can be taken out without being blocked by other components comprised in the casing.

4. Saw according to claim 3, characterized in that a lever is disposed close to the supporting surface for the engine in such a manner that after the positioning of the engine in the case said lever can actuate the control means of the carburetor.

5. Saw according to claim 2, characterized in that the coupling means forms a separate, loose unit to be threaded on and off the engine shaft, for which purpose the coupling end of the coupling means has a cross-section deviating from the circular shape for cooperation with a correspondingly shaped bearing surface of the hub bore of the corresponding coupling member in order to effect an engagement resistant to rotation between the shaft and said coupling member, the coupling means being fixed in axial direction on the one side by means of a stopper provided on the engine shaft, and on the other side by means of a portion of the fastening for the chain-equipped guide bar after said guide bar is positioned and fastened on the outside of the casing.

6. Saw according to claim 1, characterized in that the chain-equipped guide bar guided in the longitudinal direction in its fastening means carries on its fastening end a shoulder to cooperate in lateral direction with a bar which is transversally adjustable relative to the fastening means of the chain-equipped guide bar and to be fixed in desired position, said bar having an inclined guide surface relative to the adjusting direction so that the chain-equipped guide bar is displaced in its longitudinal direction and thereby the stretching of the saw toothed chain regulated when the bar is adjusted.

7. Saw according to claim 6, characterized in that the shoulder is pivoted on the chain-equipped guide bar and at different distances from the axis of rotation provided with a plurality of guide surfaces for optional adjustment of the desired control range for stretching the chain by means of said bar.

8. Saw according to claim 1, characterized in that the interior of the casing is divided by means of a partition wall separating the air inlet from the air outlet and having an aperture through which air can be forced from the chamber communicating with the inlet by means of the suction fan disposed in said chamber, the cylinder of the engine being located between the aperture in the partition wall and the air outlet in the other chamber.

9. Saw according to claim 8, characterized in that the jacket portion of the cylinder borders on the aperture of the partition wall, said aperture having corresponding slot-shaped form.

10. Saw according to claim 8, characterized in that the jacket portion of the cylinder extends partially through the aperture of the partition wall, said aperture having a corresponding rectangular form.

References Cited in the file of this patent

UNITED STATES PATENTS

| | | |
|---|---|---|
| 2,409,775 | Mall et al. | Oct. 22, 1946 |
| 2,630,844 | Abbott et al. | Mar. 10, 1953 |
| 2,827,932 | Strunk | Mar. 25, 1958 |
| 3,002,510 | Wonneman | Oct. 3, 1961 |

FOREIGN PATENTS

| | | |
|---|---|---|
| 124,596 | Austria | Sept. 25, 1931 |
| 379,962 | Great Britain | Sept. 8, 1932 |
| 676,377 | Germany | June 3, 1939 |
| 713,453 | Germany | Sept. 10, 1942 |
| 896,934 | France | May 8, 1944 |
| 809,267 | Germany | July 26, 1951 |